June 28, 1938.   F. D. MacMASTER   2,122,209

REFRIGERATED DISPLAY CASE AND THE LIKE

Filed Oct. 15, 1936

INVENTOR
Frank D. MacMaster.
BY Albert Sperry.
ATTORNEY

Patented June 28, 1938

2,122,209

UNITED STATES PATENT OFFICE 2,122,209

REFRIGERATED DISPLAY CASE AND THE LIKE

Frank D. MacMaster, Ewing Township, Mercer County, N. J., assignor to C. V. Hill and Company, Incorporated, Trenton, N. J., a corporation of New Jersey Application October 15, 1936, Serial No. 105,693

8 Claims. (Cl. 20—56.5)

This invention relates to refrigerated display cases and to similar constructions wherein multiple glass panes are employed between spaces which may differ considerably in temperature.

It is usual in the construction of refrigerated display cases to provide spaced multiple panes of glass in the front of the case to provide an insulating dead air space while permitting articles on display to be viewed from outside the case. Care must be taken to maintain the air in the dead air space relatively dry for if moisture is present or permitted to enter the space between the glass panes, it tends to condense on the colder panes causing fogging which gives the impression that the glass is not clean.

In order to avoid fogging of the glass it is usual to seal the space between the glass panes. However, this sealing is ordinarily done while the air in the space between the panes is at normal room temperature. Thereafter, upon cooling the case to a low temperature, the air in the sealed space contracts, causing the glass to bow inwardly, particularly if the pane of glass is relatively large in area. Similarly, if the case is not refrigerated, as when shipping the case, high temperature or high altitudes may cause the air within the sealed space to expand, causing the panes of glass to bow outwardly. In some instances the pressure thus created is sufficient to break the panes of glass, so that they must be replaced at considerable expense.

In accordance with the present invention, this objection to constructions of the prior art is overcome and means are provided which serve to prevent the occurrence of excessive differences in pressure between the air in the sealed space and the surrounding atmosphere. The means provided also prevent such diffusion of moisture into the sealed spaces from the outside atmosphere that fogging of the glass panes will occur.

One of the objects of the present invention is to prevent injury or breaking of panes of glass employed in refrigerated display cases and other constructions due to pressure differences created by differences in temperature or altitude.

Another object of the invention is to control the difference in pressure between the air in the space between panes of glass of refrigerated display cases and the surrounding atmosphere.

A further object of the invention is to control such pressure differences while maintaining a seal between the space between multiple glass panes and the surrounding atmosphere.

Another object of the invention is to prevent fogging of multiple glass panes of refrigerated display cases while preventing the creation of excessive pressure differences between the air in the space between the panes of glass and the surrounding atmosphere.

A further object of the invention is to equalize the pressure in adjacent dead air spaces between multiple panes of glass of refrigerated display cases.

These and other objects and features of the present invention will appear from the following description thereof, in which reference is made to the accompanying figures of the drawing which illustrate various alternative embodiments of the invention as adapted for use in refrigerated display cases.

Figure 1:
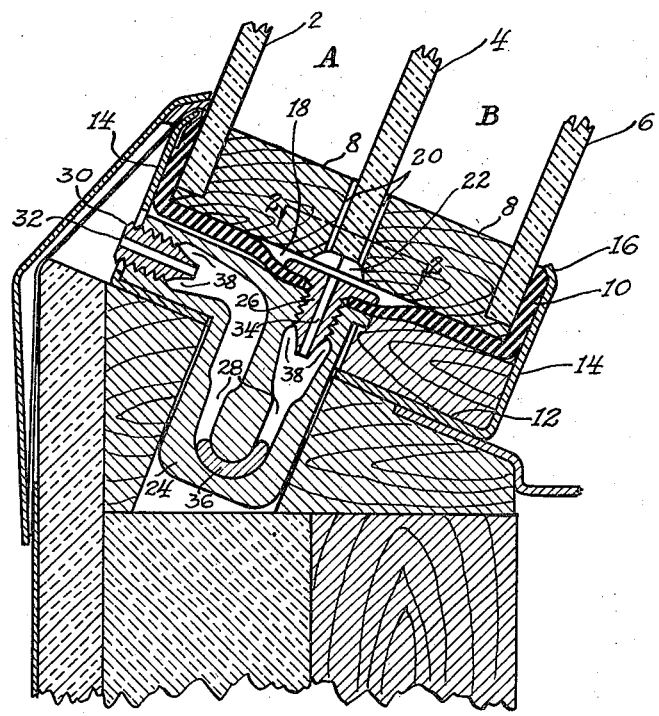
Fig. 1 is a vertical sectional view of a portion of a refrigerated display case embodying the features of the present invention.
Figures 2, 3:
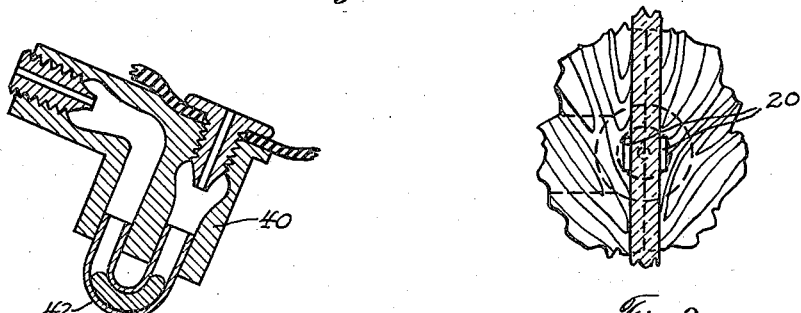
Fig. 2 is a sectional view of a portion of the construction illustrated in Fig. 1, taken on the line 2—2 thereof.
Fig. 3 is a sectional view of an alternative arrangement of means adapted for use in refrigerated display cases and the like to relieve the difference in pressure between the sealed space between panes of glass and the surrounding atmosphere.

In that form of the invention chosen for purposes of illustration in the drawing, the invention is shown as applied to a refrigerated display case having three spaced panes of glass, but it will be apparent that the invention is also applicable to constructions in which two, four or more multiple panes of glass are employed. The construction of Figures 1 and 2 is provided with an outer glass pane 2, an intermediate glass pane 4 and an inner glass pane 6. These panes are held in spaced relation by suitable means such as the wooden strips 8 extending about the margins of the glass panes for holding them in position. Rubber sealing means 10 extend beneath the wooden strips 8 and upward on the outer faces of the inner and outer glass panes 2 and 6. A retaining member 12 extends beneath the sealing means and is formed with upturned portions 14 which turn inwardly at their margins 16 to hold the sealing means against the glass panes for sealing the dead air space.

The outer glass pane 2 and the central glass pane 4 serve to define a sealed space A, while a second sealed space B is formed between the center glass pane 4 and the inner glass pane 6.

The spaces A and B communicate with a space 18 beneath the wooden strips 8 and above the rubber sealing member 10 through the channels 20 shown in Figs. 1 and 2. The channels are formed by cutting grooves in the edges of wooden strips 8 adjacent the central pane of glass 4 and the lower ends of the channels 20 may be further enlarged as at 22, if desired. The spaces A and B thus communicate with each other through the channels 20 and the space 18, so that differences in pressure between these spaces A and B may be equalized by the flow of air from one space to the other. Thus the central pane is not subjected to substantial pressure differences and may be made of thinner and lighter glass than the outer glass panes 2 and 6.

In order to prevent the occurrence of excessive pressure differences between the air in the spaces A and B and the surrounding atmosphere and in order to control this pressure difference so that the glass panes will not be injured, means are provided to permit the flow of air into and out of the spaces A and B. However, it is important that the means provided prevent continued diffusion of moisture into the sealed space and, therefore, the means employed also serves to seal the passage between the dead air space and the surrounding atmosphere.

As shown in Figs. 1 and 2 a valve construction indicated generally at 24 may be employed for this purpose, that shown being provided with a nipple 26 serving to seal the rubber packing 10 to the body of the valve. A U-shaped passage 28 extends through the valve body from the nipple 26 downwardly and then upwardly to a second nipple 30 which is provided with a passage 32 communicating with the outside atmosphere. A passage 34 in the nipple 26 provides communication between the U-shaped passage 28 and the space 18, so that air may pass from the spaces A and B through channels 20 and space 18 to the U-shaped passage 28 and out to the atmosphere.

Within the passage 28 is located a sealing means 36 which controls the flow of air through the U-shaped channel. The sealing means prevents diffusion of moisture into the sealed space and normally prevents the passage of air into or out of the sealed space but is operable in response to excessive pressure differences to permit limited amounts of air to pass through the U-shaped passage so as to avoid any injury or breaking of the glass. This sealing means may be of any suitable type and, as shown, may be a heavy liquid such as mercury, heavy oil, or the like. The upper portions of the passage 28 above the liquid sealing means may be enlarged and the ends of the nipples 26 and 30, which extend into the passage 28 may be reduced so that pockets 38 are formed into which the liquid may flow when the case is tilted during shipment or movement thereof.

The construction described serves to provide a continuous seal between the sealed spaces A and B between the glass panes, so long as the difference in pressure between the air in these spaces and the surrounding atmosphere is relatively low. However, in the event a considerable difference in pressure develops between the air in the spaces A and B and the external atmosphere, air may be drawn into or expelled from these spaces through the passage 28 by displacement of the sealing means 36. The liquid is then forced up one side or the other of the legs of the U-shaped passage until air can enter or be expelled from the sealed spaces. However, only sufficient air is permitted to enter or be expelled from the sealed spaces to avoid danger of injury to the glass. The amount of moisture carried by this small volume of air is insufficient to cause fogging of the glass, particularly in view of the fact that air does not enter the sealed space unless the temperature is very low and under such conditions the amount of moisture which air can carry is very small. Moreover, many cases include means in the sealed space for taking up moisture therefrom and continued diffusion of moisture from the atmosphere into the sealed space is prevented.

The construction shown in Fig. 1 is located adjacent the lower edge of the glass panel in the front of a display case. However, the device may be located in the end or top of the case or elsewhere, if desired. The form and shape of the body and the shape of the passage extending from the sealed space to the atmosphere may accordingly be varied, as desired.

The body of the valve may be formed of any suitable material such as porcelain, glass, metal, rubber or plastic material and the sealing means 36 may be of any suitable character which does not react with the material of the body. When using a heavy oil or other liquid care should be taken to select one which does not evaporate or oxidize on long standing.

The construction illustrated in Fig. 3 of the drawing is similar to that illustrated in Fig. 1, but comprises a body portion 40 and a separate U-shaped member 42, each of which may be readily made and the parts assembled to produce the desired form of passage. A construction of this type can be produced with the parts 40 and 42 made of different materials and the difficulties of casting or forming the valve body in a single piece are avoided. In a typical case the body 40 may be formed of rubber or metal and the U-shaped portion 42 may be formed of glass or other material which is unaffected by the action of mercury or other liquid used as the sealing means.

The height of the column of mercury and therefore the amount of pressure differential that must be built up to cause the mechanism to operate may be varied, as desired, to permit the passage of air thereby only infrequently and upon the creation of dangerous pressure differences between the sealed space and the surrounding atmosphere.

While certain typical forms of the invention have been illustrated and described as applied to refrigerated display cases for the purpose of controlling the pressure differences between air in the sealed space between multiple glass panes and the surrounding atmosphere, it will be evident that various changes in the form, construction and arrangement of the elements may be made in adapting the invention for use in different structures. Therefore, it should be understood that the forms of the invention herein shown and described are intended to be illustrative of typical embodiments of the present invention and are not intended to limit the scope thereof.

I claim:—

1. In a refrigerated display case having multiple glass panes spaced apart to provide a dead air space between an enclosure normally maintained at a low temperature and the surrounding atmosphere, means for relieving differences in pressure between the air in said dead air space and the surrounding atmosphere comprising a member having a U-shaped passage providing communication between said space and the atmosphere and a liquid which neither evaporates nor deteriorates on long standing in contact with air and moisture, located in said passage and normally sealing the same.

2. In a refrigerated display case having multiple glass panes spaced apart to provide a dead air space between an enclosure normally maintained at a low temperature and the surrounding atmosphere, means for relieving differences in pressure between the air in said dead air space and the surrounding atmosphere comprising a member having a U-shaped passage providing communication between said space and the atmosphere and mercury located in said passage and normally sealing the same.

3. In a refrigerated display case having multiple panes of glass therein providing a dead air space between the refrigerated space and the surrounding atmosphere a liquid which neither evaporates nor deteriorates on long standing in contact with air and moisture normally sealing said dead air space and movable in response to a predetermined difference in pressure between air in said dead air space and the surrounding atmosphere to temporarily destroy said seal.

4. In a refrigerated display case having multiple panes of glass spaced apart to provide a dead air space between the refrigerated space and the surrounding atmosphere, together with means for retaining said panes of glass in position, sealing means extending between said retaining means and the outer panes of glass, a valve body having a passage therethrough providing communication between said dead air space and the atmosphere, a liquid located in said passage and normally sealing the same, and means providing a seal between said valve body and said sealing means.

5. In a refrigerated display case having multiple glass panes spaced apart to provide a dead air space between the refrigerated space in the case and the external atmosphere, the combination of means for relieving differences in pressure between air in said dead air space and the external atmosphere comprising a member having a passage therethrough communicating with said dead air space and the external atmosphere, a liquid which neither evaporates nor deteriorates on long standing in contact with air or moisture located in said passage and sealing the same and means forming a chamber communicating with said passage and positioned to receive and hold said liquid on tilting of said display case during shipping or other movement of the case.

6. In a refrigerated display case having multiple glass panes spaced apart to provide a dead air space between the refrigerated space in the case and the external atmosphere, the combination of means for relieving differences in pressure between air in said dead air space and the external atmosphere comprising a member having a passage therethrough communicating with said dead air space and the external atmosphere, a liquid which neither evaporates nor deteriorates on long standing in contact with air or moisture located in said passage and sealing the same, a nipple located in said passage and formed with an opening therethrough, said nipple being provided with a portion surrounding said opening, projecting toward said liquid and spaced from the walls of said passage to provide a chamber for receiving and holding said liquid when said case is tilted during shipping or movement thereof.

7. In a refrigerated display case having multiple glass panes spaced apart to provide a dead air space between the refrigerated space in the case and the external atmosphere, together with means for holding said panes of glass in spaced relation and a rubber sealing member extending over the edges of said panes of glass and said spacing means, the combination of means for relieving differences in pressure between air in said dead air space and the external atmosphere comprising a valve having a U-shaped passage therethrough containing a liquid which neither evaporates nor deteriorates on long standing in contact with air or moisture and displaceable upon the occurrence of relatively small differences in pressure between the air in said dead air space and the external atmosphere, a member extending through said rubber sealing member and serving to provide an air-tight connection between said rubber sealing member and said valve, said member having an opening therethrough communicating with said dead air space and the passage through said valve, that portion of the member projecting into said passage extending toward said liquid and about said opening and spaced from the walls of said passage to provide a chamber for receiving and holding said liquid when said case is tilted during shipping or other movement thereof.

8. In a refrigerated display case having multiple glass panes spaced apart to provide a dead air space between the refrigerated space in the case and the external atmosphere, the combination of means for relieving differences in pressure between air in said dead air space and the external atmosphere comprising a member having a passage therethrough communicating with said dead air space and the external atmosphere, and a liquid which neither evaporates nor deteriorates on long standing in contact with air or moisture located in said passage and sealing the same.

FRANK D. MacMASTER.